United States Patent [19]

Shidner

[11] Patent Number: 4,548,026
[45] Date of Patent: Oct. 22, 1985

[54] EQUIDAE CORONET BOOT

[76] Inventor: Morris I. Shidner, 1046 Elm St., Ramona, Calif. 92065

[21] Appl. No.: 602,679

[22] Filed: Apr. 23, 1984

[51] Int. Cl.⁴ ............................................. A01L 5/00
[52] U.S. Cl. ......................................... 54/82; 168/2
[58] Field of Search ................... 168/1, 2, 18; 54/82; 128/153, 165

[56] References Cited

U.S. PATENT DOCUMENTS

| | | | |
|---|---|---|---|
| 167,895 | 9/1875 | Hall | 168/2 |
| 593,960 | 11/1897 | Dorney | 54/82 |
| 617,153 | 1/1899 | Galpin | 168/2 |
| 4,424,809 | 1/1984 | Yovankin | 54/82 X |
| 4,441,493 | 4/1984 | Nirschl | 128/165 |

FOREIGN PATENT DOCUMENTS 1580779 12/1980 United Kingdom ................. 54/82

*Primary Examiner*—Robert P. Swiatek
*Attorney, Agent, or Firm*—John J. Murphey

[57] ABSTRACT

A boot for a horse's hoof to protect the coronet comprising a layer of flexible elastomeric foam sandwiched between opposed layers of strong, flexible low-friction cloth like woven nylon, cut in a flat right circular trapezoid shape and bound around the edge with cloth tape and cross-sewn to form a tight sandwich for wrapping around the hoof and fix with Velcro® strips.

7 Claims, 3 Drawing Figures

EQUIDAE CORONET BOOT

FIELD OF THE INVENTION

This invention pertains to the field of foot coverings. More particularly, this invention relates to foot coverings and protective gear for large, solid-hoofed quadrupeds of the Equus Caballus or horse family.

BACKGROUND OF THE INVENTION

Horses' hooves are hard boney masses that become sharp along the bottom edge from constant treading. The normal gait of a horse does not generally allow contact between the hoof and one or more of the horses' legs. However, during extraordinary movements or actions, such as hard or sharp turns in a "barrel" race, or dance steps or calf roping, all actions generally encountered in horse shows, rodeos and the like, there is such a propensity for the horse to kick itself that special safety precautions must be taken.

The coronet is the lowest part of the pastern of a horse; the pastern being the short boney part of the foot above the hoof and below the fetlock just below the shank or lower part of the leg. The rear of the coronet contains ligaments and tendons as well as arteries, veins and nerve endings, and is covered and protected only by skin and hair, as opposed to other parts of the horse that are additionally protected by bone and muscle tissue. The coronet is very susceptible to injury from a blow from the hoof of the opposite leg of the horse during these rather violent, non-standard movements such as in certain show events. It is therefore important to protect the coronet, especially the coronet of the front legs where most of the side-to-side movements originate. Protective coronet boots have been thus developed to be worn by the horse during show events.

The coronet boot of the prior art is a bell-shaped molded rubber skirt called a "bell-boot" containing an upper edge, for fitting around the pastern, the skirt extending therefrom sharply bulging outward and then vertically downward to a bottom edge for a loose fit around the outside bottom edge of the hoof, and opposed vertical edges for abutment, to enclose the coronet and whole hoof by the use of external straps, ties and the like. This style of boot has been found to last a very short time, as little as one day of a horse show, and becomes tattered and destroyed by the constant blows from the horses' hooves. Part of the problem appears to stem from the high frictional rubber surface of the boot, any grazing by another hoof causes the boot to deform excessively and stretch the skirt. Another problem appears to come from the actual bell shape itself; an annular air space is created around the upper part of the hoof between the hoof surface and the bell-shaped skirt thus allowing an incoming blow from a hoof to "grab" the rubber skirt causing a fold in the rubber that seems to hold or attach itself to the striking hoof and put more stretch on the skirt as the striking hoof goes by. Two other problems occasion the prior art coronet boot; one is that the molded bell shape of the skirt will not permit the boot to lay flat thus packaging, storing and shipping are done with boxes, a significant cost item. The other problem is that the boots only come in one color, black, and are not amenable to color coordination with today's highly decorative and colorful riding outfits and tack.

SUMMARY OF THE INVENTION

This invention overcomes all of the aforementioned problems of the prior art. It comprises a flat sheet of foam elastomer cut in the shape of a right circular trapezoid sandwiched between outer layers of high strength, low surface friction cloth and bounded on the upper and lower edges by concentric arcs and on the opposed ends by straight edges with internal fasteners so that when applied to the horses' hoof and coronet, said sheet forms a full truncated cone configuration that is tight to the pastern and hoof with no annular spaces therebetween and no unsightly outer connectors.

The low friction surface allows incoming blows from a hoof to easily skid by; the lack of an air space between the hoof, pastern and skirt allows the incoming hoof to slide by without grabbing the skirt and tearing the material. This construction has resulted in a coronet boot that will outwear the prior art boot by weeks and months. This inventive boot may be made by inexpensive cutting and sewing operations, as opposed to the more costly molding operation of the present boot, and the finished product may be packaged, stored and shipped in flat packaging thus reducing costs considerably. Finally, the outer layer of cloth presents a right circular truncated cone that may be fully colored from a wide range of colors, as opposed to the characteristic black color of molded rubber, thus permitting color coordination between the coronet boots and the rider's costume.

Accordingly, the main object of this invention is a new and longer wearing coronet boot for horses. Other objects of this invention include a boot that will last longer while providing the same or more protection than the present coronet boot, a boot that is less expensive to make, cheaper to store, package and ship and a boot that is amenable to various colors to fit into color coordinations of the rider.

These and other objects of the invention will become more readily apparent by reading the following Description of the Preferred Embodiment taken in conjunction with the drawings appended hereto. The scope of protection sought by the inventor herein may be obtained from a fair reading of the claims that conclude this specification.

DESCRIPTION OF THE PREFERRED EMBODIMENT

Figure 1:
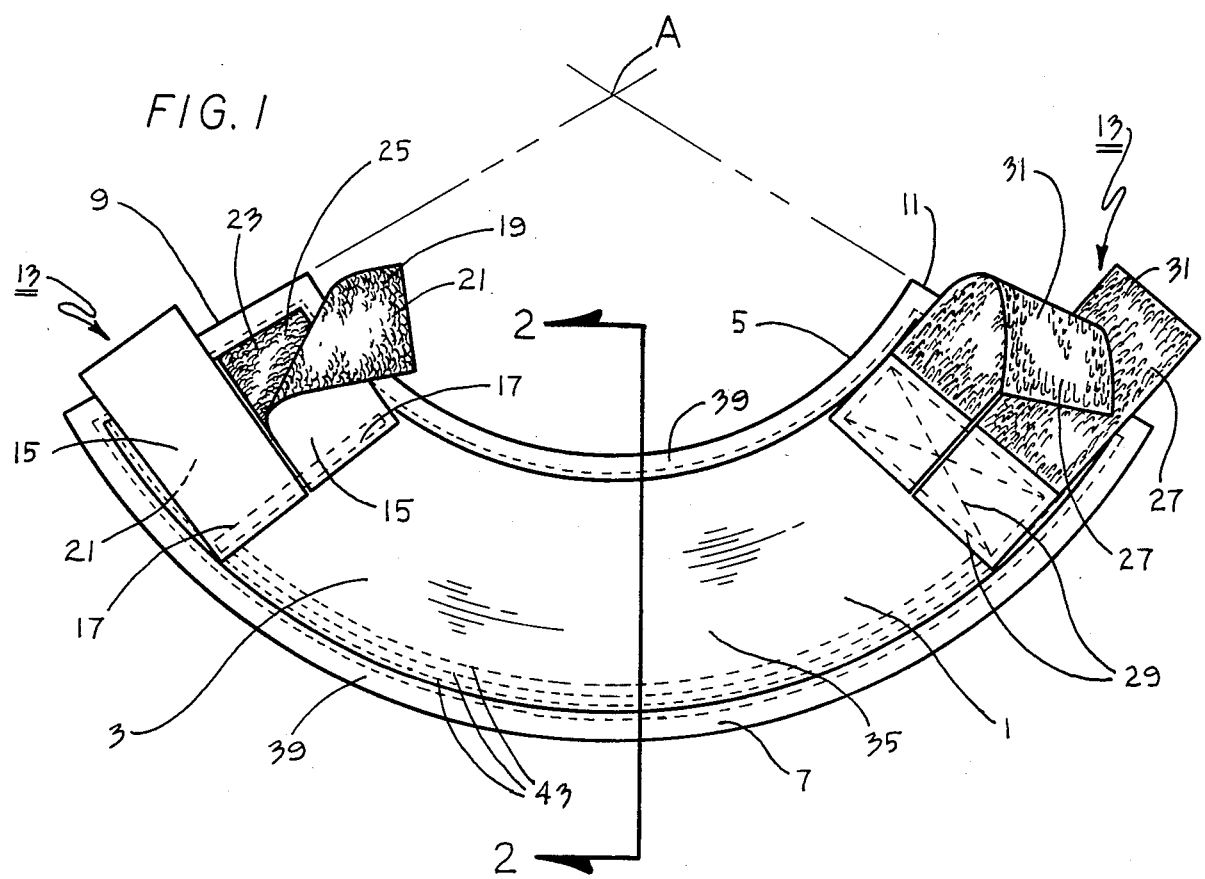
FIG. 1 is a bottom plan view of the coronet boot of this invention in its flattened configuration showing the internal fastening means.

FIG. 1 shows boot 1 of this invention in its open, flattened configuration in the shape of a circular trapezoid, preferably a right circular trapezoid 3 defined by an upper arcuate side or edge 5, a lower arcuate side or edge 7 and a pair of opposed first and second ends 9 and 11 respectively. It is preferred, albeit not necessary, that upper and lower edges 5 and 7 be concentric from a common center A and that ends 9 and 11 be straight and lay along radii from said center A. Upper edge 5 should be the typical circumference of the horse's pastern while lower edge 7 should be the typical circumference of the lower edge of the horse's hoof.

When circular trapezoid 3 is rolled up to form a truncated cone, preferably a right circular truncated cone, and placed around a horse's hoof (see FIG. 3), ends 9 and 11 meet in mutual abutment and are held together by internal attachment means 13. While said means 13 may take the form of laces or snaps or clasps and the like, it is preferred that it take the shape of a pair of strips or patches of flexible material 15, fastened to boot 1 near second end 9 such as by sewing along lines 17 and adapted to extend beyond end 9 and containing a large plurality of loop elements 19* thereof in conjunction with a similar pair of strips 23 sewn fully to boot 1 and containing an upwardly facing large plurality of similar loop elements 25. At the other first end 11 of boot 1 means 13 comprises a pair of strips or patches of flexible material 27, fastened to boot 1 near boot end 11, such as by sewing along lines 29, and adapted to extend beyond end 11, and containing a plurality of hook elements 31 on both upper and lower surfaces thereof.

*on the undersurface 21

Loop elements 19 and 25 and hook elements 31 are resilient and deformable and when pressed together become removeably entangled, securing strips 15, 21 and 27 and thus securing boot ends 9 and 11 in joined abutment. Strips 15, 23 and 27 can be released from entangled engagement by positively pulling hook elements 31 away from loop elements 19 and 25 or vice versa. The loop and hook fabric elements 15, 23 and 27 are available under the trademark "Velcro", more specific details of which may be had from U.S. Pat. No. 2,717,437 entitled VELVET TYPE FABRIC AND METHOD OF PRODUCING SAME issued Sept. 13, 1955 to George de Mestral and U.S. Pat. No. 3,114,951 entitled DEVICE FOR JOINING TWO FLEXIBLE ELEMENTS issued Dec. 24, 1963 to George de Mestral. The material is hereinafter referred to as "Velcro" loop material and "Velcro" hook material, a product of American Velcro, Inc.

Figure 2:
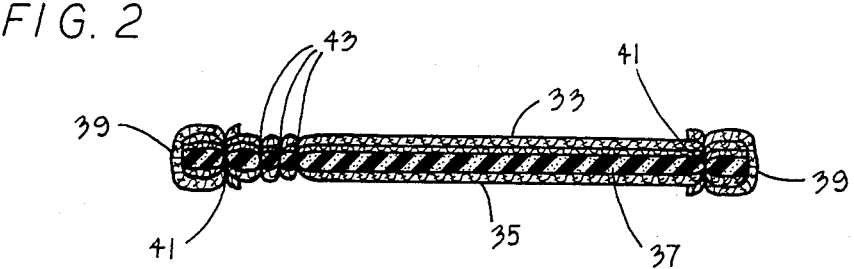
FIG. 2 is a sectional view of the coronet boot of this invention taken along lines 2—2 in FIG. 1.

FIG. 2 shows in cross-section the makeup of boot 1 to comprise opposed top outer layer 33 and bottom outer layer 35 of strong, flexible low friction material such as woven nylon cloth of which a good example is 400 Denier nylon Pack ® cloth. Sandwiched therebetween is a layer of flexible elastomeric foam 37 either with or without a fabric surface. A good example of such a material is nylon coated (one side) nitrogen-blown, $\frac{1}{8}$ inch thick neoprene foam rubber of the type used in making underwater driving suits. Surrounding upper and lower edges 5 and 7 and ends 9 and 11 is a strip 39 of strong tape, such as $\frac{3}{4}$ inch wide woven nylon tape that is sewn to the layers 33 and 35 and foam layer 37 along lines 41 and in conjunction with reinforcing sew lines 43 to form a tight, strong, cohesive composite.

Figure 3:
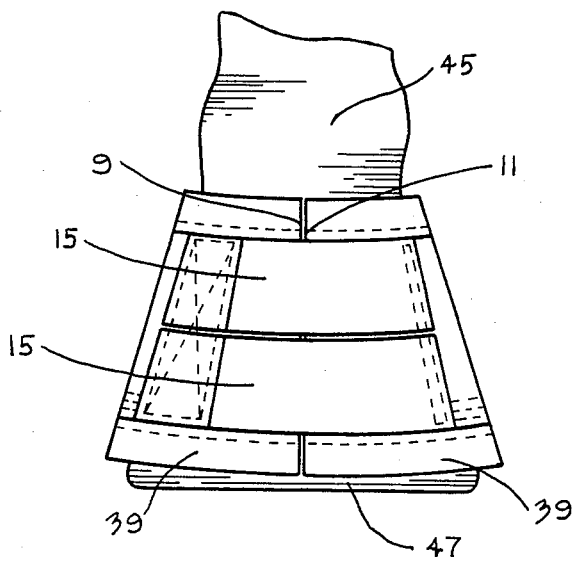
FIG. 3 is a perspective view of the coronet boot of this invention in its application to the rear of the horse's pastern and hoof.

As shown in FIG. 3, boot 1 is wrapped about the horse's pattern 45 above the hoof 47 and ends 9 and 11 abutted and "Velcro" loop strips 15 and 23 and hook strips 27 pressed together to fasten boot 1 about the horse's foot in a close-fitting truncated cone configuration.

What is claimed is:

1. A protective coronet boot for members of the Equus Caballus family comprising a layer of flexible elastomeric foam sandwiched between opposed layers of strong, flexible, low-friction material in the flattened shape of a circular trapezoid defined by opposed upper and lower curved edges and opposed first and second ends wherein:
   (a) said upper curved edge is of a length at least the circumference of the animal's pastern; and,
   (b) said lower curved edge is of a length at least the circumference of the bottom of the animal's hoof; and further including means adjacent said opposed ends to join them in mutual abutment said means comprising at least one double-sided Velcro ® strip extending from one side of said first end for receipt between opposed Velcro ® surfaces formed on the same side of said boot at said second end.

2. The coronet boot of claim 1 wherein said layer of flexible elastomeric foam is one-side woven nylon coated nitrogen-blown, $\frac{1}{8}$ inch thick neoprene foam.

3. The coronet boot of claim 1 wherein said opposed layers of strong, flexible, low-friction material comprise 400 Denier nylon pack cloth.

4. The coronet boot of claim 1 wherein said boot is surrounded by a strip of strong tape.

5. The coronet boot of claim 1 wherein said layer of flexible elastomeric foam is one-sided woven nylon coated, nitrogen-blown $\frac{1}{8}$ inch thick neoprene foam and said opposed layers of strong, flexible, low-friction material are 400 Denier nylon pack cloth.

6. A protective coronet boot for horses comprising a layer of flexible elastomeric foam sandwiched between opposed layers of strong, flexible, low-friction material in the flattened shape of a right, circular trapezoid defined by opposed upper and lower curved edges concentric from a common center and opposed first and second straight ends lying along radii from said common center, wherein:
   (a) said upper curved edge is of a length at least the circumference of the horse's pastern; and,
   (b) said lower curved edge is of a length at least the circumference of the bottom of the horse's hoof; and further including means adjacent said opposed ends to join them in mutual abutment including a pair of double-sided Velcro ® strips extending from one side of said first end for receipt between opposed Velcro ® surfaces formed on the same side of said boot at said second end; and, a strip of strong tape surrounding said edges and said ends.

7. The coronet boot of claim 6 wherein said layer of flexible elastomeric foam is one-sided woven nylon coated, nitrogen-blown $\frac{1}{8}$ inch thick neoprene foam and said opposed layers of strong, flexible, low-friction material are 400 Denier nylon cloth pack.

* * * * *